Figure 1:
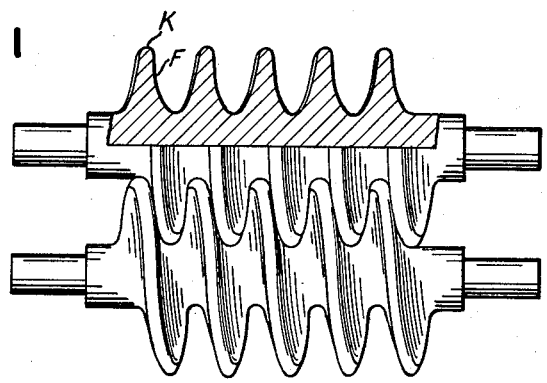

Feb. 23, 1965  HANS-GEORG ZIMMERMANN  3,170,566
SCREW CONVEYOR OR LIKE SCREW MACHINE
Filed Nov. 20, 1962  8 Sheets-Sheet 1

INVENTOR.
HANS-GEORG ZIMMERMANN
BY
ATTORNEY

Section on Line 3-3

Feb. 23, 1965    HANS-GEORG ZIMMERMANN    3,170,566
SCREW CONVEYOR OR LIKE SCREW MACHINE
Filed Nov. 20, 1962    8 Sheets-Sheet 3
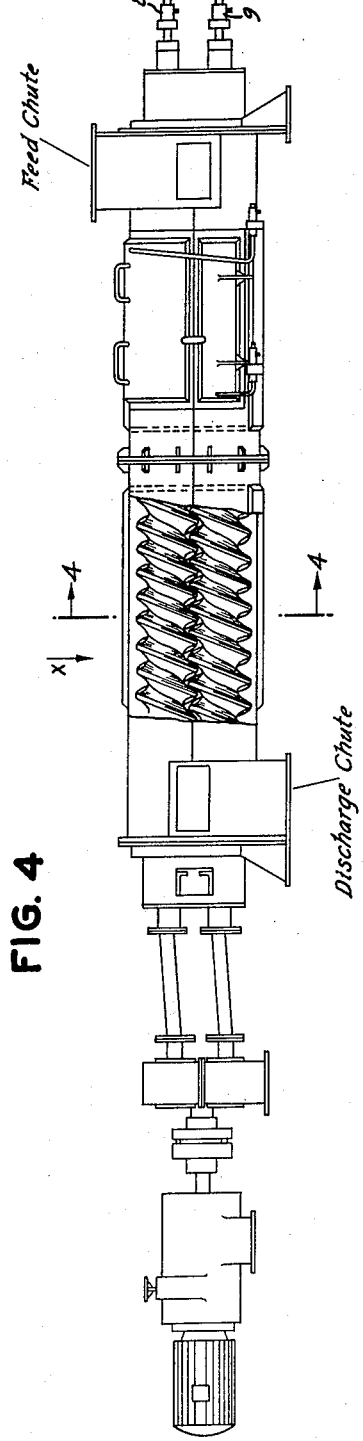
FIG. 4
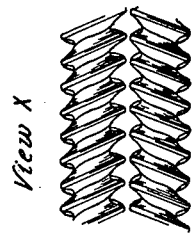
FIG. 4B    View X
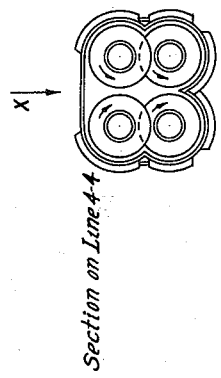
FIG. 4A    Section on Line 4-4
INVENTOR.
HANS-GEORG ZIMMERMANN
BY
James E. Bryan
ATTORNEY

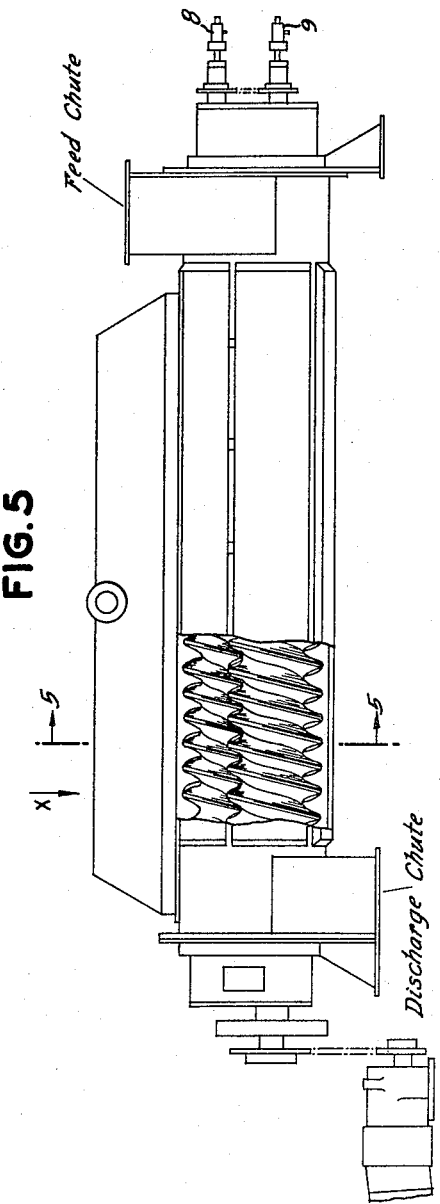
FIG. 5
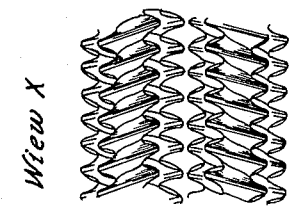
FIG. 5B  View X
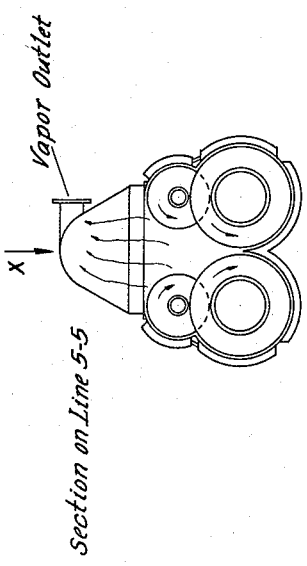
FIG. 5A  Section on Line 5-5
INVENTOR.
HANS-GEORG ZIMMERMANN

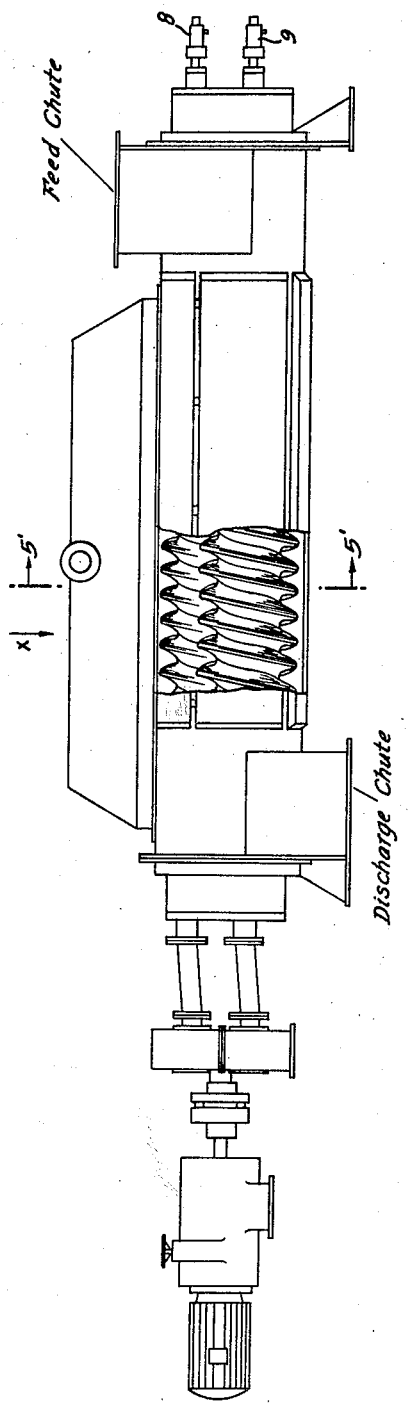
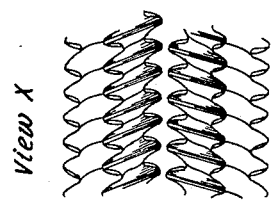
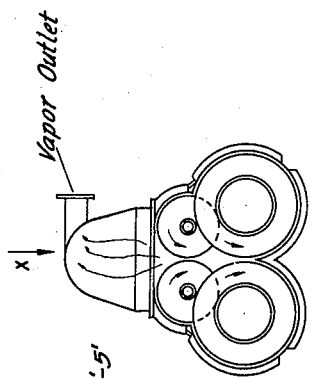

Feb. 23, 1965     HANS-GEORG ZIMMERMANN     3,170,566
SCREW CONVEYOR OR LIKE SCREW MACHINE
Filed Nov. 20, 1962     8 Sheets-Sheet 6

INVENTOR
HANS-GEORG ZIMMERMANN
BY James E. Bryan
ATTORNEY

Feb. 23, 1965  HANS-GEORG ZIMMERMANN  3,170,566
SCREW CONVEYOR OR LIKE SCREW MACHINE
Filed Nov. 20, 1962  8 Sheets-Sheet 8

*INVENTOR.*
HANS-GEORG ZIMMERMANN
BY
ATTORNEY

United States Patent Office 3,170,566
Patented Feb. 23, 1965

3,170,566
SCREW CONVEYOR OR LIKE SCREW MACHINE
Hans-Georg Zimmermann, Wiesbaden-Biebrich, Germany, assignor to Kalle Aktiengesellschaft, Wiesbaden-Biebrich, Germany
Filed Nov. 20, 1962, Ser. No. 238,877
Claims priority, application Germany, Nov. 22, 1961, K 45,290
7 Claims. (Cl. 198—213)

This invention relates to a screw conveyor or similar screw machine.

Among known screw machines comprising two or more screws rotating in the same direction there are those in which the flanks of the thread of one screw and the tip of the thread of a screw meshing with it nearly or completely contact one another along a helical line, and vice versa, so that the two screws will have swept one another after a single revolution. In a section taken on an axial plane, the flanks of the screw threads appear in these screw machines as concave curves extending from the outer screw diameter to the screw core, and the tip of the thread at the outer screw diameter appears as a vertex in which the two concave curves of the flanks meet, or as a straight line parallel to the axis by which the extra-axial end points of both curves representing the thread flanks are connected together.

In these known screw machines, the thread tip has sharp edges, and this is accompanied by some disadvantages one of which is the fact that, in screws constructed in this way, the thread tips meet the thread flanks along a helical line of contact at unfavorable angles, so that for many materials mutual sweeping of the screws is ensured only if the thread tips and the thread flanks are matched accurately with one another. In practice, however, a certain small clearance between the thread tips of one screw and the thread flanks of the other screw is unavoidable.

The present invention relates to a screw machine for conveying, kneading, extruding, cooling, heating or drying of plastic or other substances which overcomes the above-described disadvantages by means of a screw thread of novel shape and which also ensures other advantages. This screw machine, like some hitherto known screw machines, comprises at least two intermeshing screws, a housing shaped, at least partly, to confine these screws closely, and inlet and outlet apertures in the housing, two or more of the screws being coupled for rotation in the same direction and the thread tips of each of these screws being actually or approximately contacted by the thread flanks of the screw or screws meshing therewith. It has been found that screw machines of this generally known type are surprisingly efficient and, moreover, are more advantageous than hitherto known screw conveyors, when the screw thread has a convex tip and concave flanks, so that, in a section taken on an axial plane, the tip of the screw appears in the form of at least one convex tip curve and the thread flanks as concave flank curves which, at the point where they merge into the tip curve, do so tangentially to the latter. Also, the thread flank profile between the points at which the thread tip merges into the thread flanks between adjacent threads is formed in such a way that it is actually or approximately contacted by the thread tip of a meshing screw along a solid curve which travels on the meshing thread tip from one flank to the next, between the left hand and right hand transition points at which the thread tip merges into the thread flanks, so that, with each rotation of the screws, the entire surface of each screw is swept once by an adjacent screw.

Figure 2:
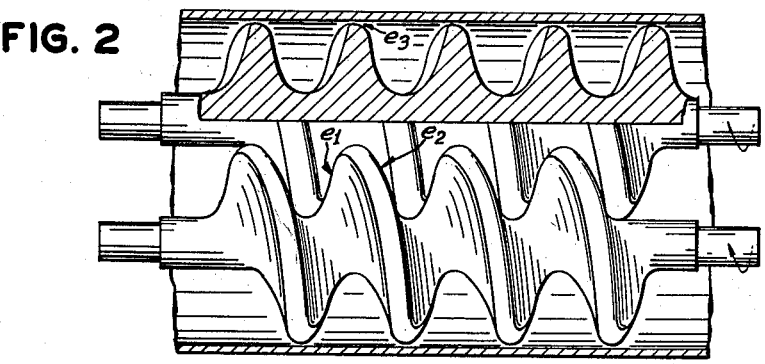
Figure 3:
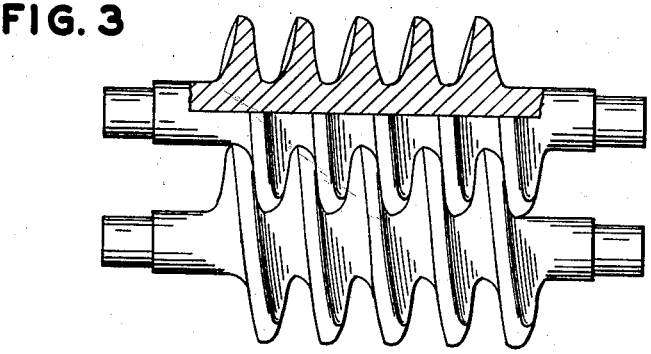
Figure 3A:
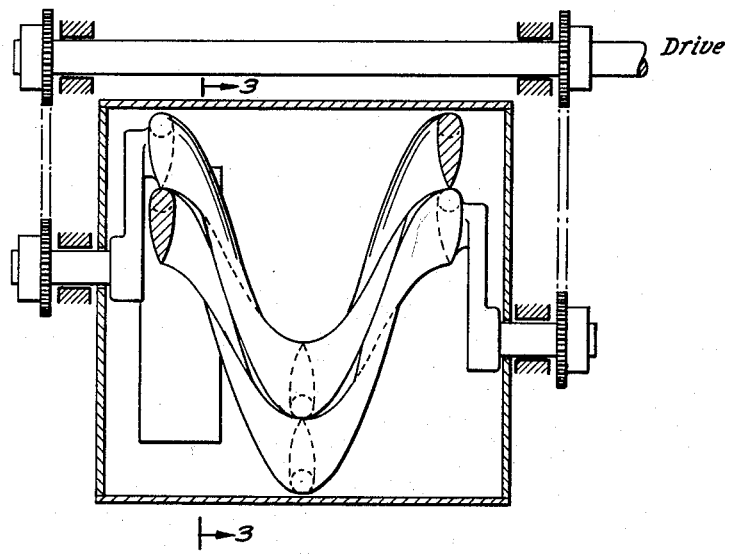
Figure 3B:
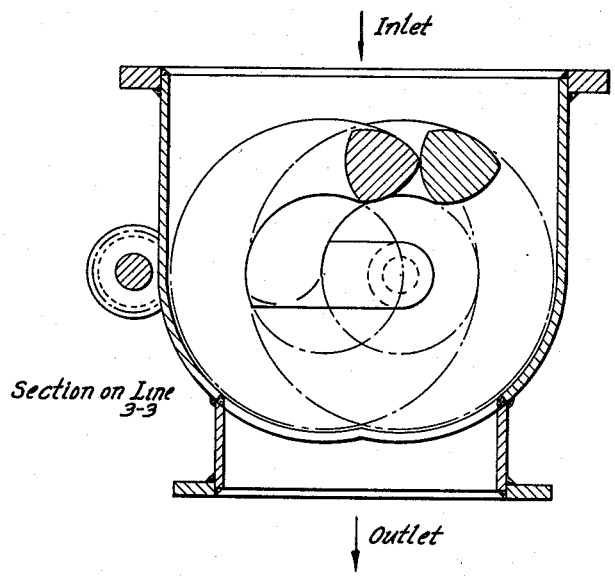
Figure 6:
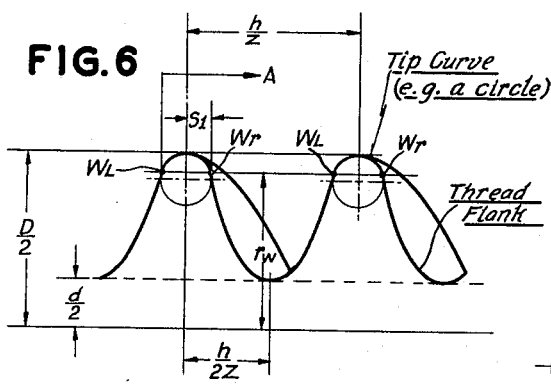
Figure 7:
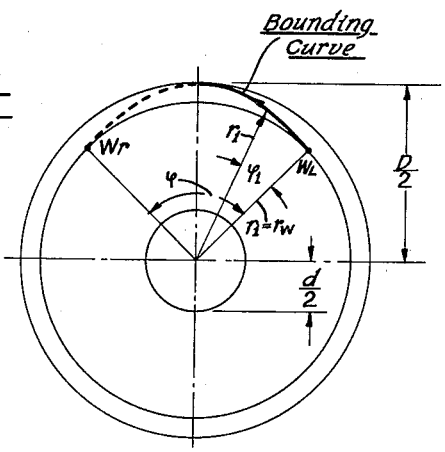
Figure 8:
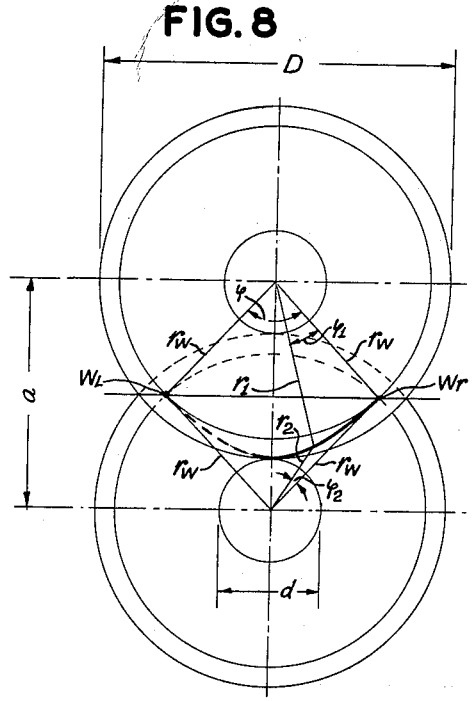
Figure 10:
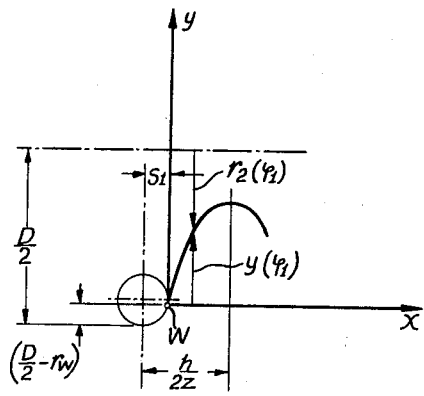
Figure 9:
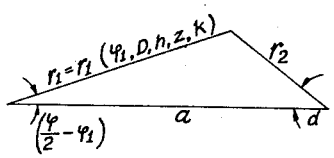
Figure 11:
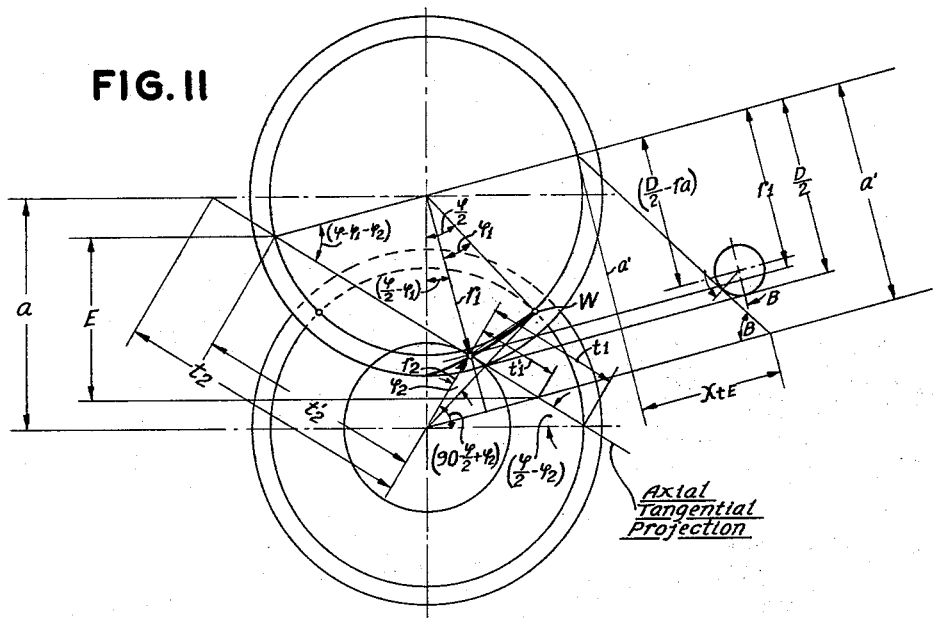
Figure 12:
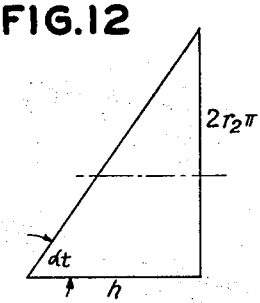
Figure 13:
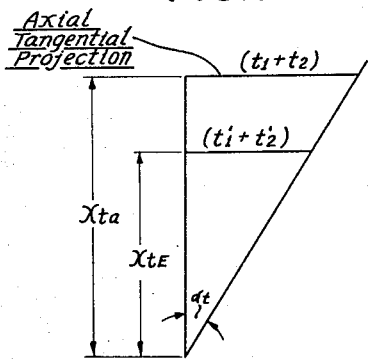
Figure 14:
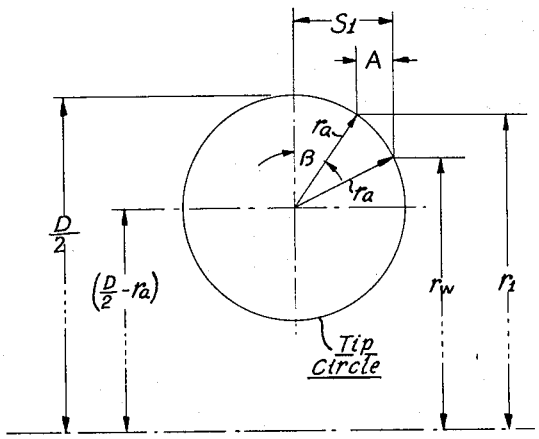
Figure 15:
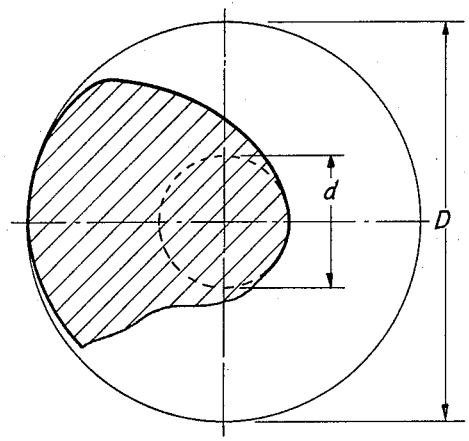
Figure 16:
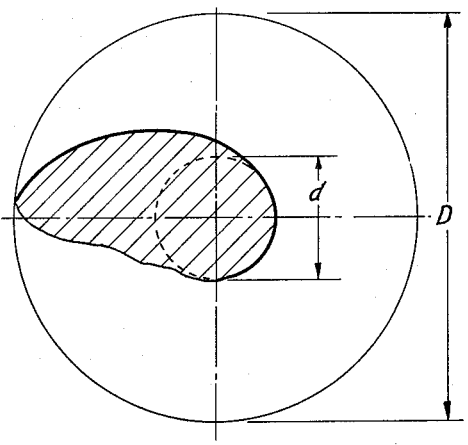
Figure 18:
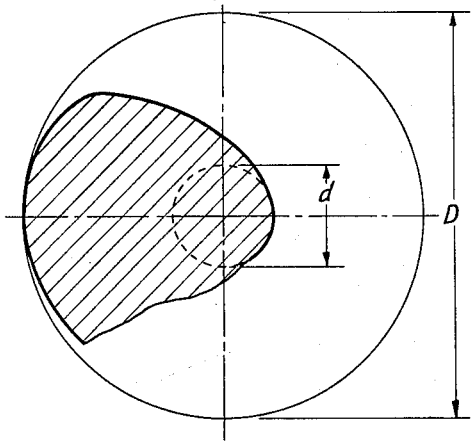
Figure 17:
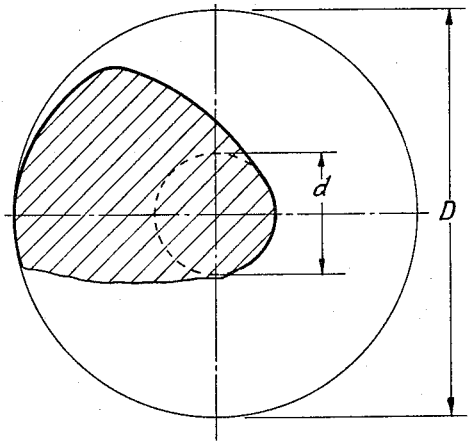
Figure 19:
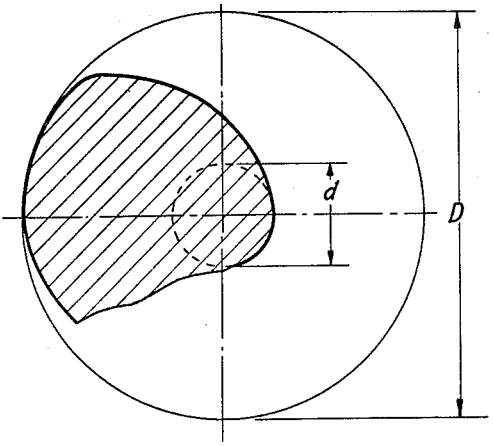

The invention is further illustrated in the accompanying drawings, in which:

FIGURE 1 is a view in elevation, partly in section, of a pair of screws for use in one embodiment of a machine according to the invention, the screw tips being symmetrically curved, FIGURE 2 is a similar view of another pair of screws the tips of which are asymmetrically curved, FIGURE 3 is similar to FIGURE 2, showing a different asymmetrical curvature, FIGURE 3A is a view in longitudinal section of a screw conveyor having interfolded flights of shankless screws, FIGURE 3B is a view in section taken on line 3—3 of FIGURE 3A, FIGURE 4 is a view in elevation of one embodiment of a screw conveyor including two groups of two equidirectional screws, one group having left-hand threads and the other having right-hand threads, FIGURE 4A is a view in section taken on line 4—4 of FIGURE 4, FIGURE 4B is view X shown looking in the direction of the arrow in FIGURES 4 and 4A, FIGURE 5 is a view in elevation of another embodiment of a screw conveyor including two pairs of screws and in which the upper screw of each meshing pair has an outer diameter smaller than the lower screw and in which the two pairs of screws run in opposite directions, FIGURE 5A is a view taken on line 5—5 of FIGURE 5, FIGURE 5B is view X looking in the direction of the arrow in FIGURES 5 and 5A, FIGURE 5C is a view in elevation of another embodiment of a screw conveyor including two pairs of meshing screws running in opposite directions, each of the upper screws of the meshing pairs having an outer diameter smaller than that of the lower screws and being mounted closer together than the lower screws so that the common axial planes of each of the two groups of intermeshing screws intersect above them, FIGURE 5D is a view in section taken on line 5'—5' of FIGURE 5C, FIGURE 5E is view X looking in the direction of the arrow in FIGURES 5C and 5D, FIGURE 6 is a fragmentary view in section taken on an axial plane of a thread with a symmetrical tip, FIGURE 7 is a projection in the axial direction of a portion of the path of a line of contact between two screws of identical form, FIGURES 8 and 9 are diagrams illustrating the mathematical relationships existing between the dimensions of two meshing screws with symmetrically curved tips, FIGURE 10 shows a thread flank curve plotted between co-ordinates $x, y$, FIGURES 11 to 14 are diagrams showing the mathematical relationships for the simplest case of a thread tip of circular formation, FIGURE 15 is a fragment of one particular section of the screw of FIGURE 1 taken in a plane perpendicular to the axis, FIGURES 16 and 17 are similar sections through the left hand and right hand flanks respectively of a screw thread as shown in FIGURE 3, and FIGURES 18 and 19 are the corresponding sections in the case of FIGURE 2.

Referring to the drawings, in screw machines according to the present invention, the screw threads are formed from a thread tip K and thread flanks F. According to the invention, the thread tip K has a convex outline, whereas the thread flanks F have a concave outline, as in hitherto known screw machines. In an axial section, the screw tip K may appear as a uniform, continuous, symmetrical or asymmetrical convex curve. Instead, it may, however, be composed of two convex curves in which case the two curves may merge with one another tangentially at the point furthest from the axis, or may intersect at an angle forming a more or less pronounced ridge at the tip. The thread tip, moreover, may be situated completely on one side of the screw thread, so that the other side of the thread is bounded merely by a concave thread flank.

In these screw machines, it is also possible for more than two screws to mesh with one another and to sweep one another. Also, these screws may be single-thread or multi-thread screws. It is also possible for the screws to penetrate up to the center line of one, or more than one, meshing screw, or even to penetrate beyond the center line. In these cases, the screw which is penetrated to the above-mentioned extent is without core or shank, that is to say, it is then formed merely by the helical thread or rib, as shown in FIGURES 3A and 3B.

With profiles as employed according to the present invention, it also becomes possible to construct self-cleaning screw pairs running in synchronism in which the outer diameters of adjacent screws are different from one another, as shown in FIGURES 5, 5A, and 5B. In general, the pitch and the number of revolutions in this case will be the same in adjacent screws, and this results in a different peripheral speed of one screw relative to the other. In this way, the material movement around the screw assembly is retarded considerably, and a satisfactory delivery rate, for example for screw machines delivering measured quantities, can be achieved.

However, the pairing of screws with different outer diameters is feasible in which the peripheral speeds of the two screws are the same; thus, for example, the smaller screw may be single-threaded and have half the outer diameter of the larger screw, whereas the latter is double-threaded with a pitch double that of the smaller screw and rotates at half the number of revolutions per minute of the smaller screw. Furthermore, in the case of a pair of screws having the same pitch for both meshing screws, one screw may have a tip curved differently from that of the adjacent screw.

Compressing screws may also be constructed with profiles according to the present invention in such a way that, while the pitch remains uniform and the axes parallel, the outer diameters are reduced in the delivery direction and the shank diameters and the width of the curved tips in the axial direction increase continuously so that the volume of the thread course becomes reduced in the delivery direction and compresses the material to be processed. Also, the self-sweeping profiles according to the invention enable compressing screws to be constructed in which the screw pairs have identical outer diameters over their entire length, while the pitch and the width of the curved tips in the axial direction are continuously reduced in the delivery direction.

The screw profiles according to the invention, while being capable of providing an almost complete seal between two adjacent meshing screws, can permit, in known manner, a gap of constant width between the thread tip of one screw and the thread flanks of the meshing screw. The novel feature and the special advantage of the profiles according to the invention having a convexly curved tip resides in that, by suitably matching the main parameters of the screws, i.e., outer diameter, pitch and number of threads per unit length and the shape of the tip, approximately identical conditions can be created as regards the gaps at the left and the right thread flanks (see, for example, FIGURE 2 at $e1$ and $e2$) whereby the shearing forces necessary for transport are rendered more uniform. Also, a better adaptation to the rheological properties of the processed material can be achieved than has been possible with hitherto known self-sweeping profiles.

When screw machines with two or more shafts rotating in the same direction are employed in which, for example, the screw threads themselves are hollow, and therefore form a helically extending channel for heating or cooling media passing therethrough for the heating, drying or cooling of substances, as shown in the constructions of FIGURES 4, 5, and 5C, in which the connections 8 and 9 are provided for the passage of heat exchange media, the efficiency is dependent upon the prevention of deposits of processed material on the heated or cooled thread flanks or on the wall of the housing, which, if necessary, is similarly heated or cooled. With larger machines, particularly those of welded construction, a more or less considerable clearance between the screws and the housing and between the thread flanks and the meshing thread tips cannot be avoided, so that in the case of hitherto known screw profiles a layer of material is deposited upon the flanks and the wall of the housing, i.e. on the entire heat exchange surface, which retards the passage of heat.

It has been found, for example in the case of the thermal treatment of alkali cellulose, that with screws according to the present invention having a suitable thread tip profile, adhesion of the material to the heat exchange surfaces can be largely prevented by the action of a shearing force upon the material layers close to the walls. These favorable conditions are largely fulfilled in the self-sweeping profiles according to the invention, because constrictions, for example $e1$, $e2$ and $e3$ in FIGURE 2, are provided at all points of separation not only between the thread tips and the housing but also along the separation lines between the thread flanks and the meshing thread tips of the adjacent screw. In these constrictions, during operation of the screw machine, a local material densification is produced, depending upon the selected curvature of the thread tip, which gives rise to a shearing action upon the layer of the material to be conveyed adjacent the housing wall, thus cleaning once during each rotation of the screw the entire heat exchange surface of the wall of the housing and of the thread flanks to such an extent that a satisfactory uniform transfer of heat is ensured.

In order to increase heat exchange by convection, it is an advantage in many cases to arrange multi-shaft screw apparatus in such a way that always two or more groups of meshing synchronized screws having the self-cleaning profiles of the invention are rotated in opposite directions in parallel planes, the peripheral circles of adjacent screw groups contacting or nearly contacting one another. In this way, a constant turnover and mixing of the processed material, and thus a uniform thermal treatment, can be achieved.

One such embodiment is illustrated in FIGURES 4, 4A, and 4B. In this case, two groups of two equidirectional screws are illustrated, the particular rotational directions being indicated, one group having left-hand threads and the other group right-hand threads.

By suitable selection of the tip curvatures, it is possible with profiles of the invention to pair self-sweeping screws in an arrangement where the adjacent meshing screws have outer diameters differing from one another. For example, when a device is to be constructed in which volatile components are to be thermally driven off in a continuous manner from a substance, then a sufficiently large fume aperture for the discharge of vapors must be provided above the screw assemblies. In this case, an arrangement may be chosen in which two, or even more, groups of self-cleaning screws, the screws of any one group running in the same direction, are arranged in parallel planes and in which the upper screw of a meshing pair has an outer diameter smaller than the lower screw, and also in which screw assemblies, composed of screws running in the same direction, are made to run in directions opposite to one another. In such an arrangement, the processed material is thoroughly mixed so that it is uniformly enabled to discharge vapors, and is afterwards drawn in by the lower screws which run in a direction opposite to that of the upper screws. One such embodiment comprising a total of four screws is illustrated in FIGURES 5, 5A and 5B, the directions of rotation being indicated. When, in a machine such as that illustrated in FIGURES 5C, 5D, and 5E, the smaller screws are brought closer together, so that the common axial planes of each of the two groups of meshing screws intersect above them, then screw conveyors are obtained which have a very satisfactory mixing action.

The above-described screw apparatus can be fabricated in various ways, for example the housing and the screw threads may be produced either in a welded or cast construction, or machined from solid stock. It is also possible for different modes of fabrication to be combined in one and the same apparatus.

The shape which the concave flanks of the screw thread must have when a tip of given profile is to be employed is best determined by means of a generally applicable mathematical derivation of the conditions applying thereto, and with reference to a practical example.

Assuming that, for an intermeshing pair of screws of the same outer diameter, the following dimensions are given which will be called the principal screw dimensions: the outer diameter $D$, the pitch of the screw threads $h$, and the number of screw threads per unit length $z$. In addition, the curve of the tip $k$ must be given. The parameters then to be determined are the inter-axial separating distance of the two screws, and the form of the thread flanks.

It is further assumed that the tip of the screw thread, in section taken on an axial plane, has the form of some bent symmetrical curve, for example a circle, ellipse or the like. The profile of a screw thread in section taken on an axial plane is then composed of the convex curve of the tip and the concave curve of the flank which latter merges with the former tangentially. The points of transition between these two curve portions are denoted by $w$ or, if a distinction is to be made between right and left transition point, by $w_r$ and $w_1$ respectively, and their radial distance from the screw axis by $r_w$. Half the axial width of the tip at $r_w$ is referred to by $s_1$. Simple geometrical calculation shows that the "turning points" $w$ are also the points of contact of the intermeshing screws, which, in axial projection, produce the maximum angle at the center (FIGURE 2). The angle at the center between $w_r$ and $w_1$, which appears in axial projection in FIGURES 6 and 7, can be geometrically determined therefrom to be:

$$\varphi = \frac{180}{z} - \frac{2 \cdot 360 \cdot s_1}{h} \quad (1)$$

In this expression, the value $s_1$ is dependent upon the principal screw dimensions above referred to, and the tip curve $k$, and thus $s_1$ can be generally expressed as a function of $h$, $D$, $z$ and $k$:

$$s_1 = s_1(h, D, z, k) \quad (2)$$

Hence:

$$\varphi = \frac{180}{z} - \frac{2 \cdot 360}{h} \cdot s_1(h, D, z, k) \quad (3)$$

The inter-axial distance $a$ of adjacent screws can be read from FIGURE 8 as:

$$a = 2 \cdot r_w \cdot \cos \frac{\varphi}{2} \quad (4)$$

The value $r_w$ can be accurately determined geometrically when the principal screw dimensions and the tip curve $k$ are given, since quite generally:

$$r_w = r_w(D, h, z, k) \quad (5)$$

Thus, the inter-axial distance $a$ can be expressed as follows:

$$a = 2 r_w(D, h, z, k) \cdot \cos \left[ \frac{90}{z} - \frac{360}{h} \cdot s_1(h, D, z, k) \right] \quad (6)$$

The shank diameter $d$ then becomes $$d = 2a - D \quad (7)$$

It can be seen from Equations 1, 4 and 7 that intermeshing self-cleaning pairs of screws which do not possess a shank, but overlap up to the screw center or beyond are also possible. With intermeshing screws of different diameter, combinations are feasible in which only one of the screws is without shank.

The bounding solid curve is a line common to the thread flanks of one screw and the intermeshing thread tip of the adjacent screw. If a thread tip curve is bent, the points of contact shown in FIGURE 7, which determines the bounding curve, travel along this tip, beginning with $\varphi_1 = 0$ (point $w_1$) and proceeding with increasing $\varphi_1$ and thus with an increasing radius vector $r_1$ up to the culmination point at $$\varphi_1 = \frac{\varphi}{2} \text{ and } r_1 = \frac{D}{2}$$

to complete their travel in the region from $$\varphi_1 = \frac{\varphi}{2}$$

to $\varphi_1 = \varphi$ with a decreasing radius vector up to the point of contact $w_r$ on the other side of the tip. The axial projection of the bounding curve $r_1(\varphi_1)$ in the regions of $\varphi_1 = 0$ and $\varphi_1 = \varphi$ is again dependent upon the principal screw dimensions $D$, $h$, $z$, and on the tip curve $k$, and it is therefore possible to express:

$$r_1 = r_1(\varphi_1, D, h, z, k) \quad (8)$$

Then, according to FIGURES 8 and 9:

$$r_2 = \sqrt{r_1^2(\varphi_1, D, h, z, k) + a^2 - 2a r_1(\varphi_1, D, h, z, k) \cos(\varphi/2 - \varphi_1)} \quad (9)$$

When, as illustrated in FIGURE 10, a co-ordinate system with its origin in $w$ is placed in the section taken on an axial plane, then the following defining equations are obtained for the curve of the flank which is the continuation of the curve of the tip from the point $w$:

$$y = r_w - \sqrt{r_1^2(\varphi_1, D, h, z, k) + a^2 - 2a r_1(\varphi_1, D, h, z, k) \cos\left(\frac{\varphi}{2} - \varphi_1\right)} \quad (10)$$

$$x = \frac{h}{360} \cdot \varphi_1 + A(\varphi_1, D, h, z, k) + \frac{h}{360} \cdot \varphi_2 \quad (11)$$

wherein $A(\varphi_1, D, h, z, k)$ takes account of the axial displacement of the points of contact of the tip curve from $w_r$ to $w_1$.

From FIGURES 8 and 9 it follows that $$\varphi_2 = \frac{\varphi}{2} - \alpha \quad (12)$$

and from the obtuse-angled triangle (FIGURE 9) that $$\alpha = \arctan \frac{r_1(\varphi_1, D, h, z, k) \cdot \sin\left(\frac{\varphi}{2} - \varphi_1\right)}{a - r_1(\varphi_1, D, h, z, k) \cos\left(\frac{\varphi}{2} - \varphi_1\right)} \quad (13)$$

By substituting expressions 12 and 13 into Equation 11 we obtain:

$$x = \frac{h}{360} \cdot \varphi_1 + A(\varphi_1, D, h, z, k) + \frac{h}{360}\left(\frac{\varphi}{2} - \arctan \frac{r_1(\varphi_1, D, h, z, k) \cdot \sin\left(\frac{\varphi}{2} - \varphi_1\right)}{a - r_1(\varphi_1, D, h, z, k) \cdot \cos\left(\frac{\varphi}{2} - \varphi_1\right)}\right) \quad (14)$$

The above Equations 1 to 14 are general mathematical formulae for closely bounding, self-cleaning thread profiles for the case of a symmetrical tip curve $k$. For asymmetrical tip curves, separate calculations of a similar kind need to be made for the left and right flanks of a thread. The functions $$r_1(\varphi_1, D, h, z, k)$$
$$A(\varphi_1, D, h, z, k)$$
$$s_1(h, D, z, k)$$
$$r_w(D, h, z, k)$$

can be determined accurately when the principal screw dimensions and the tip curve $k$ are known.

For the simple case of a circular tip curve $k$ of radius $r_a$ the following equations may be given for the purpose of evaluation. They are derived, by calculation and rearrangement, from FIGURES 11, 12, 13 and 14:

$$\frac{s_1}{\sqrt{r_a^2-s_1^2}}=$$
$$\frac{2\pi}{h}\left(\frac{D}{2}-r_a+\sqrt{r_a^2-s_1^2}\right)\sin\left(\frac{180}{z}-\frac{2s_1\cdot 360}{h}\right)=s_1(h, D, z, k) \quad (15)$$

Thus, Equation 1 has become solvable, and $\varphi$ may be determined. In addition $r_w$ is given by:

$$r_w=\frac{D}{2}-r_a+\sqrt{r_a^2-s_1^2} \quad (16)$$

and, with $r_w$, also the inter-axial distance $a$ according to Equation 4.

From $$r_1=\frac{r_a}{\sqrt{\frac{4\pi^2}{h^2}a^2\sin(\varphi/2-\varphi_1)+1}}+\frac{D}{2}-r_a \quad (17)$$

a value for $r_1(\varphi_1, D, h, z, k)$ is obtained and from $$A=s_1-\sqrt{r_a^2\varphi-\left[r_1-\frac{D}{2}+r_a\right]^2} \quad (18)$$

$A(\varphi_1, D, h, z, k)$ is also obtainable, so that the Equations 10 and 14 can be practically evaluated.

The three above-described screw pairs, illustrated in FIGURES 1 to 3, have been calculated from the foregoing mathematical relationships. In each of FIGURES 1 to 3 intermeshing screw pairs are shown and the thread profiles, composed of convex tips and concave flanks, are represented in the sections taken on an axial plane. FIGURE 15 shows a section of the screw of FIGURE 1 on a particular plane perpendicular on the axis. The intersection characteristics for the left and right hand sides of a thread are here identical, owing to the symmetry of the thread tip. In FIGURES 16 to 19, the intersections of the left and right hand sides of the asymmetrical screw threads according to FIGURES 2 and 3 have been shown in a plane perpendicular to the screw axis, FIGURES 16 and 17 applying to the screw according to FIGURE 2, and FIGURES 18 and 19 to that illustrated in FIGURE 3. From these figures it is seen, as described above, that the profiles according to the invention have intersection characteristics completely different from the hitherto known self-cleaning profile, in the case of which the curve of the flank in its intersection perpendicular to the axis appears as a circle tangential to the core or shank diameter with the inter-axial distance as radius.

It will be obvious to those skilled in the art that many modifications may be made within the scope of the present invention without departing from the spirit thereof, and the invention includes all such modifications.

What is claimed is:

1. A screw conveyor comprising at least two interfolded screw flights, a housing at least partially shaped to closely confine the screw flights and having inlet and outlet means therein, at least two interfolded flights being adapted to rotate in the same direction, the thread tips of each flight being closely adjacent the thread flanks of the interfolded flight, the threads having convex tips and concave flanks, so that in an axial section the tip of a thread appears in the form of at least one convex tip curve and the thread flanks as concave flank curves which merge tangentially into the tip curve, the thread flank profile between the points where the thread tip merges into the thread flanks between adjacent threads being so formed that it is closely adjacent the thread tip of the interfolded flight along a solid curve which travels on the meshing thread tip from one flank to the next between the left- and right-hand transition points at which the thread tip merges into the thread flanks, whereby with each revolution of the screws the entire surface of each screw is swept once by the adjacent screw.

2. A screw conveyor according to claim 1 in which the interfolded flights have different outside diameters.

3. A screw conveyor according to claim 1 in which at least one of the interfolded flights is a shank-less screw with the interfolded flight penetrating at least as far as the center thereof.

4. A screw conveyor according to claim 1 in which the threads of at least one screw flight are hollow and form a passage for heat transfer media.

5. A screw conveyor according to claim 1 in which at least two interfolded screw flights adapted to rotate in the same direction are mounted adjacent to at least two interfolded screw flights adapted to rotate in the opposite direction, the common axial planes of the interfolded flights being parallel.

6. A screw conveyor according to claim 1 in which at least two interfolded screw flights adapted to rotate in the same direction are mounted adjacent to at least two interfolded screw flights adapted to rotate in the opposite direction, the common axial planes of the interfolded flights intersecting above them.

7. A screw conveyor according to claim 1 in which the screw flights are in contact.

References Cited in the file of this patent

UNITED STATES PATENTS

| | | |
|---|---|---|
| 2,652,954 | Nowak | Sept. 22, 1953 |
| 2,731,241 | Christian | Jan. 17, 1956 |
| 2,869,743 | Williams | Jan. 20, 1959 |

FOREIGN PATENTS

| | | |
|---|---|---|
| 75,506 | Germany | June 6, 1894 |

UNITED STATES PATENT OFFICE
CERTIFICATE OF CORRECTION

Patent No. 3,170,566                                          February 23, 1965

Hans-Georg Zimmermann

It is hereby certified that error appears in the above numbered patent requiring correction and that the said Letters Patent should read as corrected below.

Column 6, lines 58 to 62, for that portion of formula (13) reading $$\left(\frac{\varphi}{2} - \frac{\varphi_1}{\varphi_1}\right) \quad \text{read} \quad \left(\frac{\varphi}{2} - \varphi_1\right)$$

column 7, lines 30 to 33, for that portion of formula (17) reading "sin" read -- $\sin^2$ --; same column 7, lines 35 to 37, for that portion of formula (18) reading "$r_a^2 \varphi$-" read -- $r_a^2$- --.

Signed and sealed this 28th day of September 1965.

(SEAL)
Attest:

ERNEST W. SWIDER                                   EDWARD J. BRENNER
Attesting Officer                                           Commissioner of Patents